(12) United States Patent
Ueda et al.

(10) Patent No.: US 7,589,933 B2
(45) Date of Patent: Sep. 15, 2009

(54) STORAGE (75) Inventors: Masanori Ueda, Kawasaki (JP); Masaya Suwa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 120 days.

(21) Appl. No.: 11/789,676

(22) Filed: Apr. 25, 2007

(65) Prior Publication Data
US 2008/0041549 A1  Feb. 21, 2008

(30) Foreign Application Priority Data
Jun. 26, 2006  (JP) .............................. 2006-175443

(51) Int. Cl.
*G11B 33/14* (2006.01)
(52) U.S. Cl. .................................. 360/97.02
(58) Field of Classification Search .............. 360/97.02, 360/97.01
See application file for complete search history.

(56) References Cited
U.S. PATENT DOCUMENTS
6,342,979 B1 * 1/2002 Hori ........................... 359/819

6,690,540 B2   2/2004 Hirasaka et al.
2002/0044374 A1 4/2002 Hirasaka et al.

FOREIGN PATENT DOCUMENTS

| CN | 2445837    | 9/2001  |
|----|------------|---------|
| JP | 11-213539  | 8/1999  |
| JP | 2002-124072| 4/2002  |
| JP | 2005-313220| 11/2005 |

* cited by examiner

Primary Examiner—Allen T Cao
(74) Attorney, Agent, or Firm—Greer, Burns & Crain, Ltd.

(57) ABSTRACT

A mold used to manufacture, through metal mold casting, a damper that is fixed onto a housing in a disc drive and reduces a vibration of the housing, the disc drive recording information in and reproducing information from a recording medium. The mold includes a sectionally concave body that defines a shape of the damper, a first gate that introduces molten metal to the body from a runner, and is provided on a first side opposite to a concave of the body, and a second gate that introduces the molten metal to an overflow well from the body, and is provided at least one of a second side perpendicular to the first side, and a third side perpendicular to the second side and parallel to the first side.

2 Claims, 7 Drawing Sheets

| TECHNIQUE | DAMPER MATERIAL | MATERIAL SPECIFIC GRAVITY | MATERIAL EXPENSE RATIO (PER UNIT WEIGHT) | DAMPER WEIGHT PER VOLUME OF 9.30m³ | HOUSING'S TOTAL WEIGHT (GF) WHEN HOUSING WEIGHT IS 250GF | HOUSING WEIGHT RATIO | SURFACE TREATMENT | COST RATIO |
|---|---|---|---|---|---|---|---|---|
| FORGING | BRASS | 8.4 | 1 | 78 | 328 | 1 | PLATING | 0.75 |
| STAMPING (FINE BLANKING) | BRASS | 8.4 | 1 | 78 | 328 | 1 | PLATING | 0.75 |
| STAMPING (THIN PLATE LAMINATION)  | BRASS | 8.4 | 1 | 78 | 328 | 1 | PLATING | 1 |
| MACHINING | BRASS | 8.4 | 1 | 78 | 328 | 1 | PLATING | 0.65 |
| LOST WAX | STAINLESS STEEL | 7.9 | 0.50 | 73 | 323 | 0.98 | NONE | 0.40 |
| SINTER | SUS304 SUS FINE POWDER | 7.2 | 2.40 | 67 | 317 | 0.97 | NONE | 0.60 |
| INJECTION MOLDING | HYPERBARIC RESIN MATERIAL | 7~8 | 5.00 | 65~74 | 315~324 | 0.96 | NONE | 0.80 |
| ZINC DIE CASTING | ZDC2 | 6.6 | 0.36 | 61 | 311 | 0.95 | PLATING | 0.15 |

STORAGE

This application claims a foreign priority based on Japanese Patent Application No. 2006-175443, filed on Jun. 26, 2006, which is hereby incorporated by reference herein in its entirety as if fully set forth herein.

BACKGROUND OF THE INVENTION

The present invention relates generally to a mold used to manufacture a member formed through metal mold casting, and a manufacturing method of the member. The present invention also relates to a damper manufacturing mold, and more particularly to a damper manufacturing method that uses metal mold casting. The present invention is suitable, for example, for a manufacture of a damper used for a hard disc drive ("HDD"). Although a description will now be given of a damper as the member for the HDD, the present invention is also applicable to another member.

Along with the recent widespread Internet, etc., providing of an inexpensive magnetic disc drive that records a large amount of information including still and motion pictures is increasingly demanded. A high recording density disc drive needs high-accuracy head positioning performance, and it is necessary for this purpose to precisely produce a housing that houses a recording medium with reduced vibrations and deformations. An environmentally friendly characteristic is also important, such as a reduced noise during operations and an effective use of a material in the manufacturing process.

Aluminum die casting is used to produce a housing of a magnetic disc drive for a precise shape so as to use the same coefficient of linear expansion as that of a head actuator, etc. In addition, the housing is made heavier to reduce the noises and the vibrations by attaching a weight (vibration damper) to the housing and by damping the vibrational energy. See, for example, Japanese Patent Application, Publication No. 2002-124072.

Since aluminum has such a low specific gravity as 2.7, a damper is made of a material, such as iron having such a high specific gravity as 7.9, stainless steel having a specific gravity of 7.9, and brass having a specific gravity of 8.3.

Use of brass for the damper is advantageous since it has a high specific gravity. However, its material cost is high, and it needs a corrosion protection treatment. Iron is inferior to brass in workability, but the material cost is lower. However, in comparison with brass, iron expensively requires a thicker corrosion protection treatment. On the other hand, stainless steel does not need a corrosion protection treatment, but its material cost is high and inferior in workability.

A conceivable damper manufacturing process with a metallic material includes stamping using a pressing machine, lost wax process, metal mold casting (including die casting), and so on.

The magnetic disc drive needs to arrange a damper in the housing, but the housing has only a limited attachment space. Therefore, a comparatively thick damper is needed to increase the damper weight. As for a stamping process, a large size and increased thickness would increase a stamping machine size and its comparatively large material margin causes a large material loss and the cost increase. In addition, it is difficult for stamping to form a three-dimensional shape that has a thick part and a thin part on the one-body member.

Lost wax process is a self-extinguishing casting that destroys a die whenever the damper is manufactured, complex and takes a long process, and therefore expensive. Forging, machining, sintering, resin injection molding, etc. are also conceivable but these methods have merits and demerits, such as a large working facility, a long cycle time, and a high material cost.

Figure 6:
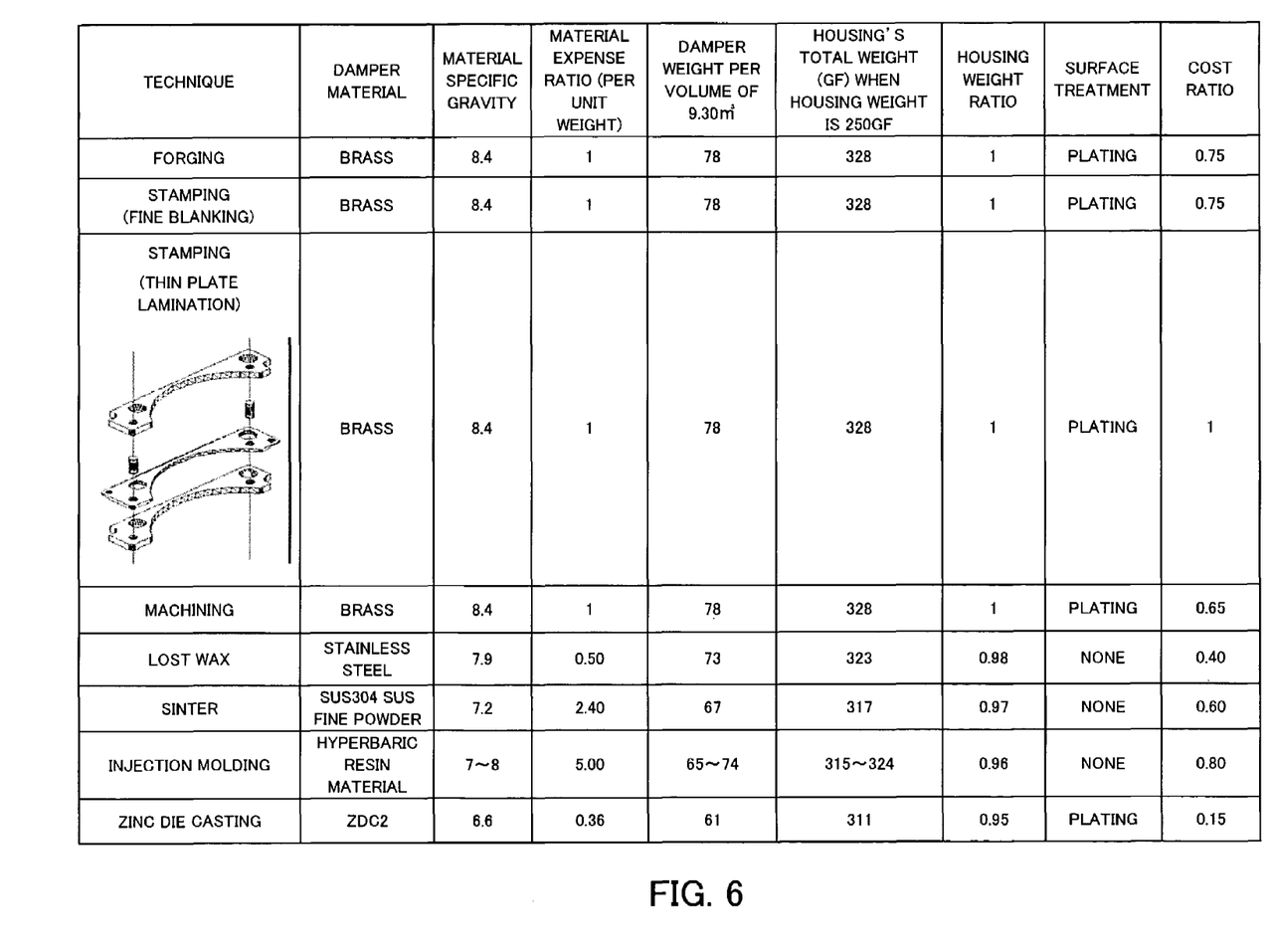
FIG. 6 is a table that shows a relationship among the high specific gravity material, the manufacturing process, and the manufacturing cost comparison.

FIG. 6 shows a table that indicates a relationship among a manufacturing process, a high specific gravity material, and a cost ratio. FIG. 6 also shows metal mold casting, in addition to the above material and manufacturing process. As understood from FIG. 6, the metal mold casting (labeled as "zinc die casting" in FIG. 6) is well-balanced among the candidate manufacturing processes in view of the material cost and productivity, and most economical in view of the cost ratio of 0.15.

Metal mold casting is a casting method by filling molten metal in a durable mold, and a method for mass-producing precise cast with fine casting surfaces by filling the molten metal in a durable die is particularly referred to as die casting. Metal mold casting generally has a filling process, a gate cutting process, and a surface treatment process. The filling process fills molten metal from an injection gate in a mold, cools down and solidifies it. The cutting process cuts the gate from a cast. The surface treatment process is a painting or plating so as to prevent a surface corrosion and micro-dust from the casting surface.

Prior art include, for example, Japanese Patent Applications, Publication Nos. 2005-313220 and 2002-124072. Saburo Kobayashi, "Design and Manufacture of Die Cast Die," FIG. 3.1, Nikkan Kogyo Shinbun, Ltd., Dec. 24, 1993.

High specific gravity metal suitable for metal mold casting is brass and zinc alloy. Brass has a specific gravity higher than zinc alloy but its melting point is so high that the durability is low and unsuitable for the mass production. Accordingly, the instant inventors have studied metal mold casting that utilizes zinc alloy.

In this respect, Japanese Patent Application, Publication No. 2002-124072 discloses, at paragraph no. 0019, that "each of Cu, Zn, and stainless steel has a specific gravity higher than aluminum of the base 12, and is suitable for a material of a damper 42. In addition, when the damper 42 is made of a metallic material, it can be easily manufactured through a well-known process, such as casting and forging. Casting and forging can manufacture the damper 42 integrally." Therefore, this reference discloses a concept of manufacturing a damper through metal mold casting of zinc (Zn).

However, in reality, when a prototype of a damper is made of zinc alloy (ZDC2) through metal mold casting, generated gas from the molten metal and enclosed gas during molten metal filling process causes surface defects (rough casting surface), and the subsequent surface treatment suffers adhesion defects and peeling of painting and plating. The surface treatment intends to prevent micro-dust from the casting surface as well as corrosion of zinc alloy. The surface-treated damper is fixed onto the backside of the housing of the disc drive. Thereafter, the housing is put in a clean room, and mounted with a disc, a carriage, etc. The degraded surface treatment, such as an exposure of casting surface and peeling due to adhesion defects, may contaminate the disc drive and the clean room, and resultantly affect the manufacturing quality of the disc drive.

Figure 7:
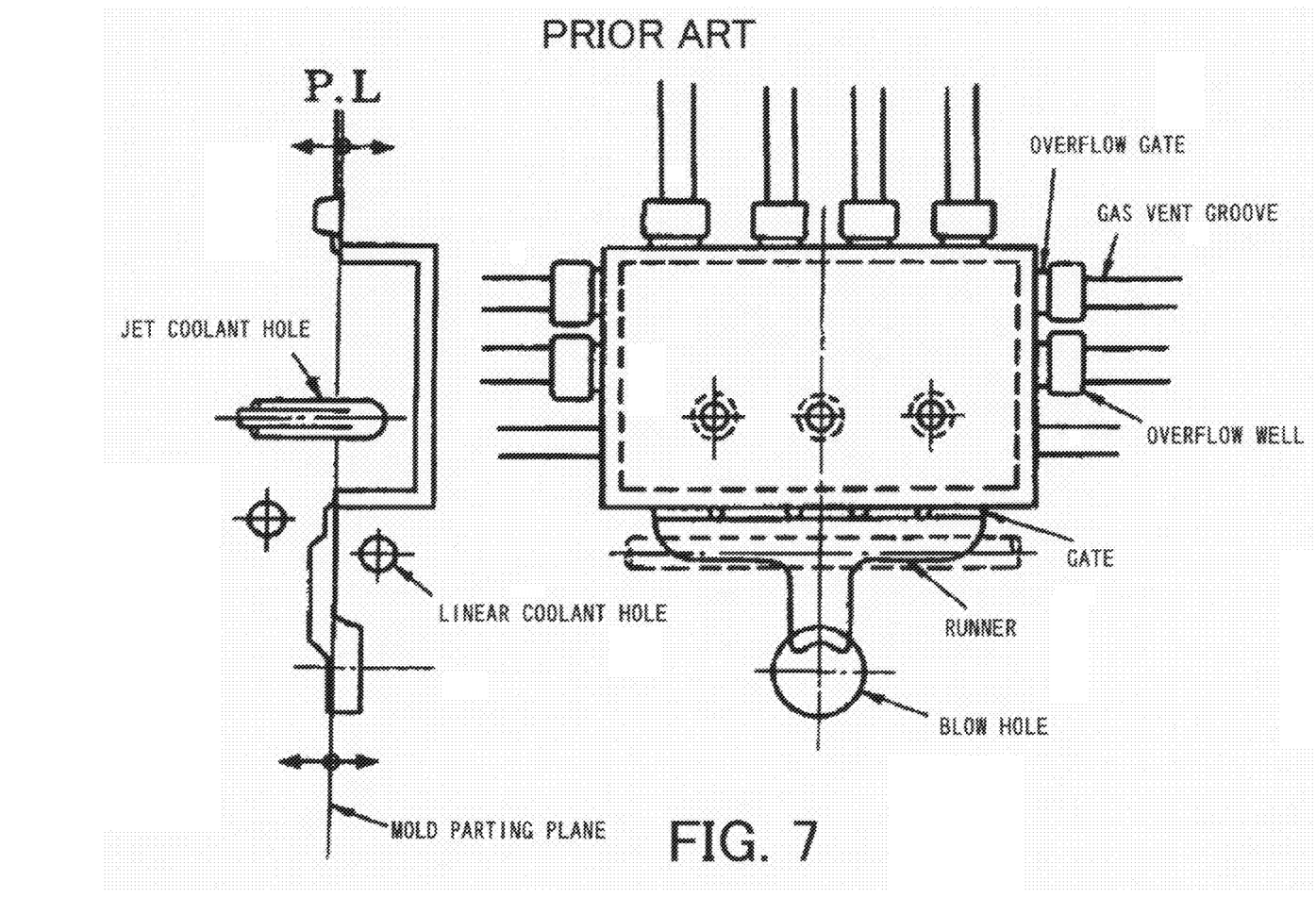
FIG. 7 is a schematic plane view showing a conventional arrangement of the overflow well gate.

Avoiding the above problems, as shown in FIG. 7, Kobayashi proposes in FIG. 3.1 to provide a overflow gate connected to an overflow well to the entire perimeter of the mold except an injecting side from which molten metal is introduced from a biscuit or casting port (i.e., three sides in this case) so as to remove generated gas from the molten metal filled in the box-shaped mold (with no lid).

However, the overflow gate provided to the entire perimeter of the mold as proposed by Kobayashi in manufacturing the damper increases a material waste, takes time to fill the molten metal in the mold, and causes porosity and misrum. In addition, Kobayashi increases the cutting force in the cutting process that separates gates from a cast, a size of the cutting machine, and the cost. It is thus preferable to limit the overflow gate to a position where the stagnant gas is likely to occur. The place where the stagnant gas is likely to occur depends upon the convection flow of molten metal.

BRIEF SUMMARY OF THE INVENTION

Accordingly, it is an exemplary object of the present invention to provide a mold used to manufacture a high-quality damper economically through metal mold casting, and a manufacturing method that uses the mold.

A mold according to one aspect of the present invention used to manufacture, through metal mold casting, a damper that is fixed onto a housing in a disc drive and reduces a vibration of the housing, the disc drive recording information in and reproducing information from a recording medium includes a sectionally concave body that defines a shape of the damper, a first gate that introduces molten metal to the body from a runner, and is provided on a first side opposite to a concave of the body, and a second gate that introduces the molten metal to an overflow well from the body, and is provided at least one of a second side perpendicular to the first side, and a third side perpendicular to the second side and parallel to the first side. This mold removes a stagnant gas from the body through the outflow well. In addition, this mold limits the second gate to the second and/or the third sides that are likely to generate a stagnant gas instead of providing the second gate to the entire perimeter, improving the filling performance, and facilitating the subsequent cutting process. It is preferable that the second gate is provided in an approximately bilateral symmetry with respect to an axis perpendicular to the first side that halves the first side.

A thickness of each of the first and second gates is, for example, 2 mm or below, thereby facilitating the subsequent cutting process. The first gate may include three or more gates, and a central gate may be wider than each of the gates at both sides. The wide central gate weakens the pressure of the molten metal that collides with the center of the concave, and prevents a deformation of the concave, porosity, and misrum. In addition, the molten metal reaches both sides and the center of the concave almost at the same time, preventing a deformation, such as warping, and rough casting surface due to a molten metal cool-down time difference.

A method according to another aspect of the present invention for manufacturing a damper that is fixed onto a housing in a disc drive and reduces a vibration of the housing, the disc drive recording information in and reproducing the information from a recording medium, uses metal mold casting and the above mold. This manufacturing method exhibits a similar operation to the above mold. Molten metal of metal mold casting is, for example, zinc alloy, such as ZDC2, because zinc alloy has a low melting point, and can maintain the durability of the mold. The method may further include the step of surface-treating the cast, and omit the step of polishing the casting surface. The surface treatment protects corrosions, and prevents micro-dust from the casting surface. The well-controlled filling step enables the polishing step to be omitted, maintaining the economical efficiency. In addition, this configuration prevents peeling due to adhesion defects of the surface treatment, and a contamination of the disc drive and the clean room in which the damper is subsequently introduced, finally maintaining the manufacturing quality of the disc drive.

The disc drive manufacturing method according to another aspect of the present invention includes the step of fixing a damper manufactured by the above damper manufacturing method onto a housing, and mounting a recording medium and a head part that records information in and reproduces the information from the recording medium. Even when the mounting step is performed in the clean room, a contamination of the disc drive and the clean room can be prevented since there is no micro-dust from the casting surface of the damper, or no peeling due to good adhesion of the surface treatment. Thus, the manufacturing quality of the disc drive can be maintained.

Other objects and further features of the present invention will become readily apparent from the following description of the preferred embodiments with reference to accompanying drawings.

DETAILED DESCRIPTION OF THE PREFERRED EMBODIMENTS

Figure 1:
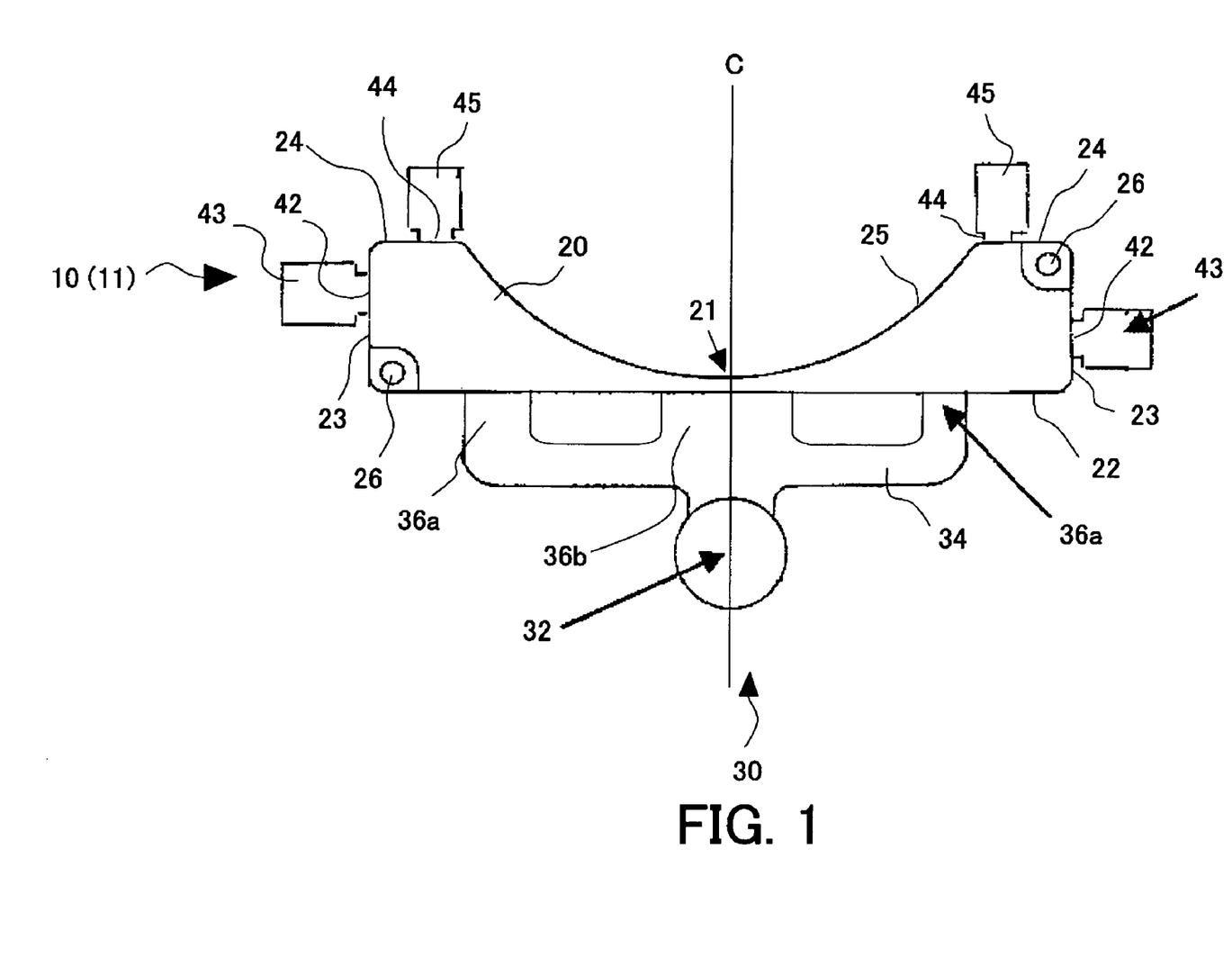
FIG. 1 is a schematic plane view of a movable mold in a metal mold casting according to one aspect of the present invention.
Figure 2A:
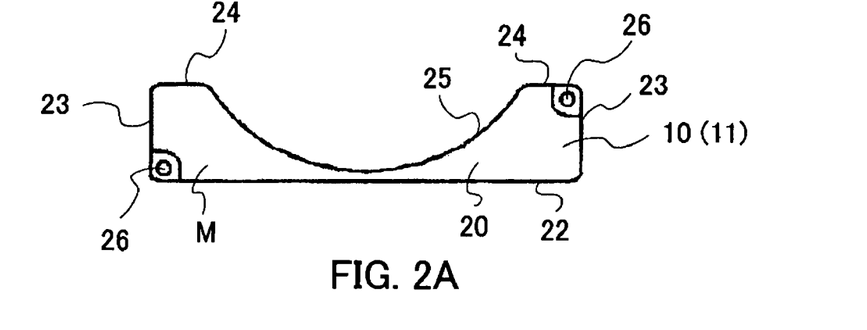
FIG. 2 is a schematic view of a mold in the metal mold casting shown in FIG. 1.
Figure 2B:
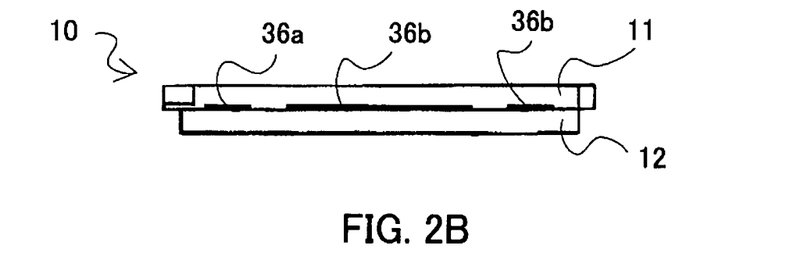
Figure 2C:
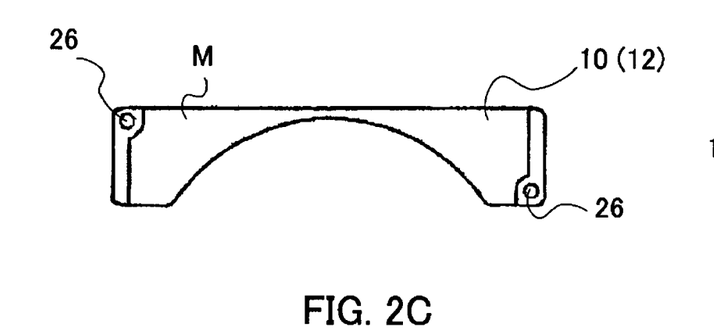
Figure 2D:
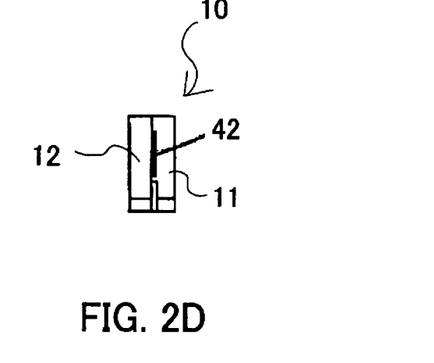

Referring now to the accompanying drawings, a description will be given of a method for manufacturing a damper (or weight) through metal mold casting including die casting. Referring now to FIGS. 1 to 2D, a description of a mold (or die) 10 used for metal mold casting will be given. Here, FIG. 1 is a schematic plane view of a movable mold (or die) 11 of the mold 10, but omits an ejector pin. FIG. 1 may be recognized as a schematic plane view of a cast with metal injecting part and over-flow wells right after molten metal cools down and solidifies. FIGS. 2A to 2D are schematic views of a mold (or die) 10. The mold 10 is fixed on a hot chamber casting machine. However, the present invention is not limited to a type of a casting machine, a cold chamber casting machine or another casting machine may be used.

The mold 10 includes the movable mold 11 and the stationary mold 12, and the movable mold 11 moves relative to the stationary mold 12. The movable mold 11 includes, as shown in FIG. 1, a body 20, a metal injecting part 30, a pair of overflow wells 43 and 45. FIG. 2A is a plane view of the body 20 of the movable mold 11. FIG. 2B is a side view of the mold 10 viewed from the metal injecting part 30. FIG. 2C is a plane view of part corresponding to the body 20 in the stationary mold 12. FIG. 2D is a side view of the mold 10 viewed from the side 23.

This embodiment uses zinc alloy (ZDC2) for molten metal. Zinc alloy has a low melting point, and is preferable to maintain the durability of the mold 10. However, the present invention allows brass to be used for molten metal as long as the mold 10 can maintain predetermined durability. Brass has a specific gravity higher than ZDC2, and a damping characteristic higher than ZDC2. When the housing weight is addressed, the housing weight mounted with a zinc alloy weight is 95% of the housing weight mounted with the brass weight (FIG. 6), and a specific-gravity difference does not affect the damping characteristic. A composition of ZDC2, is indicated in Table 1:

As a result, the molten metal injection velocity from the central injection gate 36b is lower than that from the injection gates 36a at both sides. A distance between the injection gate 36a and the opposite side of the cavity is longer than a distance between the injection gate 36b and the opposite side of the cavity. When the molten metal is introduced from all the injection gate 36a and 36b at the same velocity, the molten metal introduced from the injection gate 36b collides with the

TABLE 1

| Si | Cu | Mg | Zn | Fe | Mn | Ni | Sn | Co | Ti | Pb | Cd | Be | Al |
|---|---|---|---|---|---|---|---|---|---|---|---|---|---|
| — | <0.25 | 0.02-0.06 | Residue | <0.10 | — | — | <0.003 | — | — | <0.005 | <0.004 | — | 3.5-4.0 |

The movable mold 11 in cooperation with the stationary mold 12 forms a cavity M, and the cavity M defines a shape of the damper as a product part. The body 20 has a sectionally concave or U shape corresponding to a shape of the formed damper. The concave section is illustrative for a weight in a 3.5 inch HDD, and has a shape that removes part of a circle (R41 mm) from a rectangular parallelepiped plate with a length 94 mm (in a longitudinal direction shown in FIG. 1), a width of 21 mm (in a lateral direction shown in FIG. 1), and a thickness of 10 mm (a direction perpendicular to the paper plane of FIG. 1). The sectionally U shape has, as shown in FIG. 1, three sides 22 to 24, and a concave (R part) 25. In the body 20, the center 21 of the concave 25 has a width of about 2 mm at a narrowest position between the concave 25 and the side 22 in this embodiment. The side 22 is a molten metal injecting side provided with injection gates 36a and 36b, which will be described later. A pair of sides 23 is orthogonal to the side 22. The side 24 is a side parallel to the side 22 and perpendicular to the side 23.

The body 20 has a pair of screw holes 26 used to fix the body 20 onto a housing of a disc drive (not shown). The number of screw holes 26 may be one. A screw 180, which will be described later, is inserted into each screw hole 26.

The metal injecting part 30 has a biscuit 32, a runner 34, a pair of injection gates 36a and 36b. The biscuit 32 is connected to the runner 34, and introduces molten metal supplied from a molten metal source (not shown in FIG. 1) into the runner 34. The runner 34 is a passage to the cavity from the biscuit 32, and connected to the injection gates 36a and 36b.

A pair of injection gates 36a is formed in a bilateral symmetry with respect to a centerline or axis C shown in FIG. 1. In addition, the injection gate 36b is also formed in a bilateral symmetry with respect to the centerline C shown in FIG. 1. However, the present invention allows a bilaterally asymmetrical arrangement of the gates. The injection gates 36a and 36b are provided on a parting line between the stationary mold 12 and the movable mold 11 on the side 22 of the mold body 20, and its thickness is 2 mm or below (1 mm in this embodiment). A small gate thickness facilitates the subsequent cutting process.

This embodiment includes three injection gates, and the central injection gate 36b is wider than each of a pair of injection gates 36a at both sides. For example, each injection gate 36a has a rectangular section having a thickness of 1 mm and a length of 10 mm, and the injection gate 36b has a rectangular section having a thickness of 1 mm and a length of 32 mm. The wide central injection gate 36b weakens the pressure of the molten metal that collides with the center 21 of the concave 25, preventing a deformation of the center 21 of the concave 25.

opposite side of the cavity and then spreads along the cavity surface, enclosing gas in the cavity. In addition, with a difference between the molten metal reaching time near the center 21 of the concave 25 and the molten metal reaching time near the sides 23 and 24, a cool-down time difference causes a deformation, such as warping, and rough cast surface. Changing of the injection velocity between the injection gates 36a and 36b as in this embodiment can prevent porosity, misrum, rough casting surface and a deformation, such as warping, The overflow wells 43 and 45 serve to remove front molten metal including impurities and the stagnant gas from the cavity. The overflow gate 42 connects the cavity M to the overflow well 43, and the overflow gate 44 connects the cavity M to the overflow well 45. The overflow gates 42 and 44 are parts having minimum sectional areas provided on the parting line between the stationary mold and the movable mold on the sides 23 and 24 of the mold body 20. Similar to the injection gates 36a and 36b, a thickness of each of the injection gates 42 and 44 is 2 mm or smaller (1 mm in this embodiment). A small thickness of the gate facilitates the subsequent cutting process. For example, the overflow gates 42 and 44 each have a rectangular section having a thickness of 1 mm and a length 6 mm. In an alternative embodiment, the overflow gates 42 and 44 have different sizes.

This embodiment uses the overflow wells 43 and 45 to secure a casting surface without casting surface defects by removing the stagnant gas from the cavity. In addition, this embodiment limits the overflow gates 42 and 44 to the sides 23 and 24 instead of the entire perimeter of the body 20 except the side 22 provided with the injection gates 36a and 36b (i.e., the sides 23 and 24 and concave 25). In other words, this embodiment does not provide the overflow well to the concave 25. The overflow gate 42 may be provided at least one of the sides 23 and 24.

The overflow gates are limited to the side 23 and/or the side 24 because the instant inventors have discovered that the convection flow of molten metal is likely to occur near the sides 23 and 24, and the stagnant gas is likely to occur near there.

This embodiment does not provide the overflow gates 42 and 44 to the entire perimeter of the body 20. This reduces the cutting force of the subsequent cutting process, a size of the cutting machine, and maintains the cost efficiency. In addition, this embodiment does not provide the concave 25 with the overflow gates 42 and 44. When a certain range that includes the center 21 of the concave 25 is provided with the overflow gate, molten metal from the injection gate 36b mostly escapes from that overflow gate, causing filling defects.

A recycle material contains more impurities and smuts than a virgin material, and causes surface treatment defects.

Therefore, it is preferable to refrain from using it. Although this embodiment recycles solidified metal from the metal injection part 30 and the overflow wells 43 and 45 (solidified metal part cut off in the subsequent cutting process), another embodiment discards the these cut-off parts. The embodiment that discards the cut-off parts limits the overflow well to a minimum range, and improves the effective use of molten metal, maintaining the cost efficiency.

Since the injection gates 36a and 36b are arranged in a bilateral symmetry with respect to the axis C that passes the center of the side 22 and is perpendicular to the side 22, it is preferable that the overflow gates 42 and/or 44 are arranged in a bilateral symmetry with respect to the axis C.

FIG. 1 shows the overflow gate 42 narrower than the overflow well 43, but they may have the same width. This is true of the overflow gate 44 and the overflow well 45. The overflow wells 43 and 45 may be connected to gas vent grooves as shown in FIG. 7.

Metal mold casting of this embodiment has a filling process, a cutting process, a deburring process, and a surface treatment process.

The filling process clamps the movable mold 11 with the stationary mold 12 to form the cavity M after attaching the mold 10 to the hot chamber casting machine. Then, molten metal is filled in the cavity from the metal injecting part 30. After the molten metal is cooled down and solidified, the movable mold 11 is released from the stationary mold 12. Next, an ejector pin that moves in the movable mold 11 (not shown) separates the cast from the movable mold 11. FIG. 1 may be recognized as the cast in this state.

Conceivably, the cutting process is manual cut-off, milling, or trimming press. The gate of this embodiment can be manually cut off, but manual cut-off has various problems, such as inefficiency, scattering of cut positions, and a rough surface at the cut position, reduces appearance and surface treatment quality. This embodiment simultaneously cuts off all of the gates using a trimming press machine (of 20 ton class). When the gate is provided on the surface of the concave 25, it is difficult for the trimming press machine to precisely cut off the R shape and thus the arrangement of the overflow gates 42 and 44 improves the productivity.

The deburring process uses relatively inexpensive shot blasting.

The surface treatment process is a corrosion protection process such as painting and plating. The surface treatment also prevents micro-dust from the cast. This embodiment adopts relatively inexpensive nickel electroplating. Any surface defect affects the plating adhesion defects and appearance quality. The porosity causes gases and swells due to the plating solution residue, degrading the plating quality. Machining process, such as polishing, may remove a chilled layer (which is a rapidly chilled layer having a fine surface tissue) and expose the inside casting defects. Machining process is omitted also for cost reduction purposes. This embodiment provides the mold with the overflow gates 42 and 44, and achieves a fine casting surface even when the polishing process is omitted. The quality of the surface treatment is high.

Figure 3:
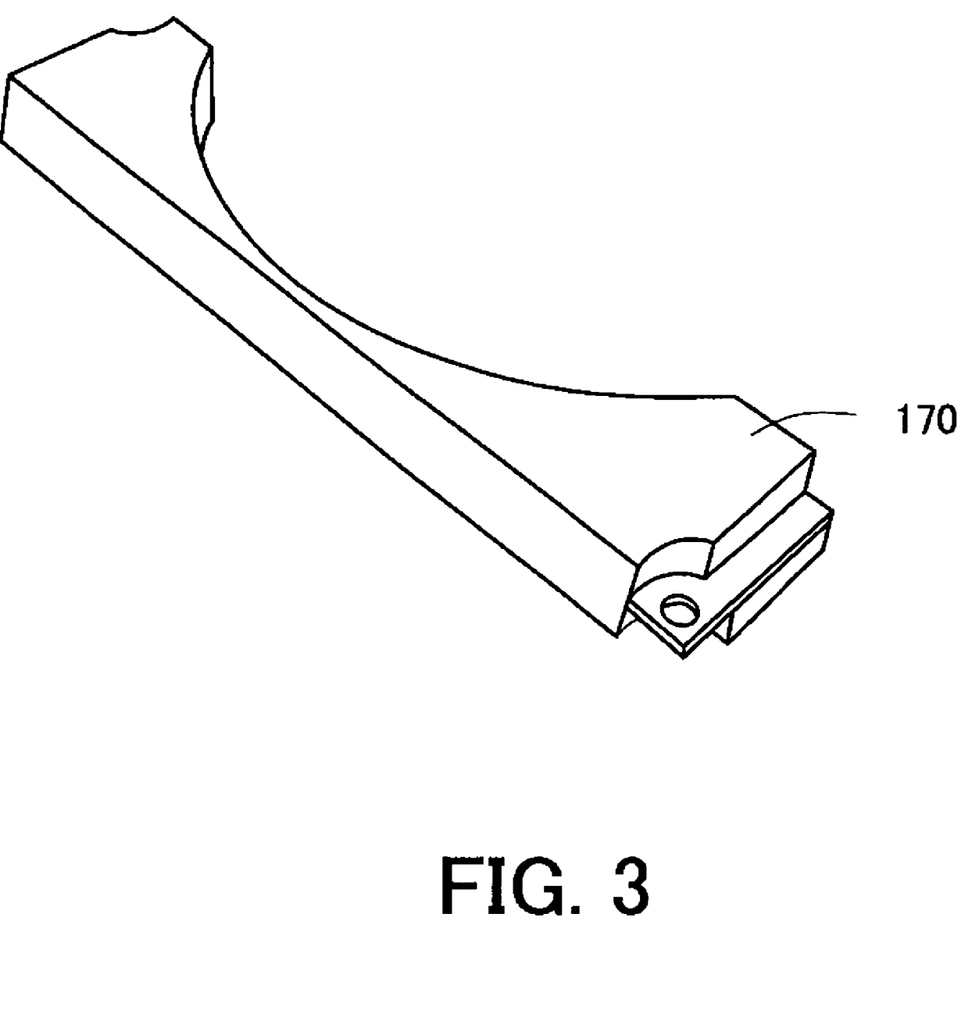
FIG. 3 is a perspective view of a weight (damper) according to the present invention.

FIG. 3 shows a damper (weight) 170 obtained by this embodiment. The weight 170 may have a three-dimensional shape partially including a projection in its shape shown in FIG. 3.

Figure 4:
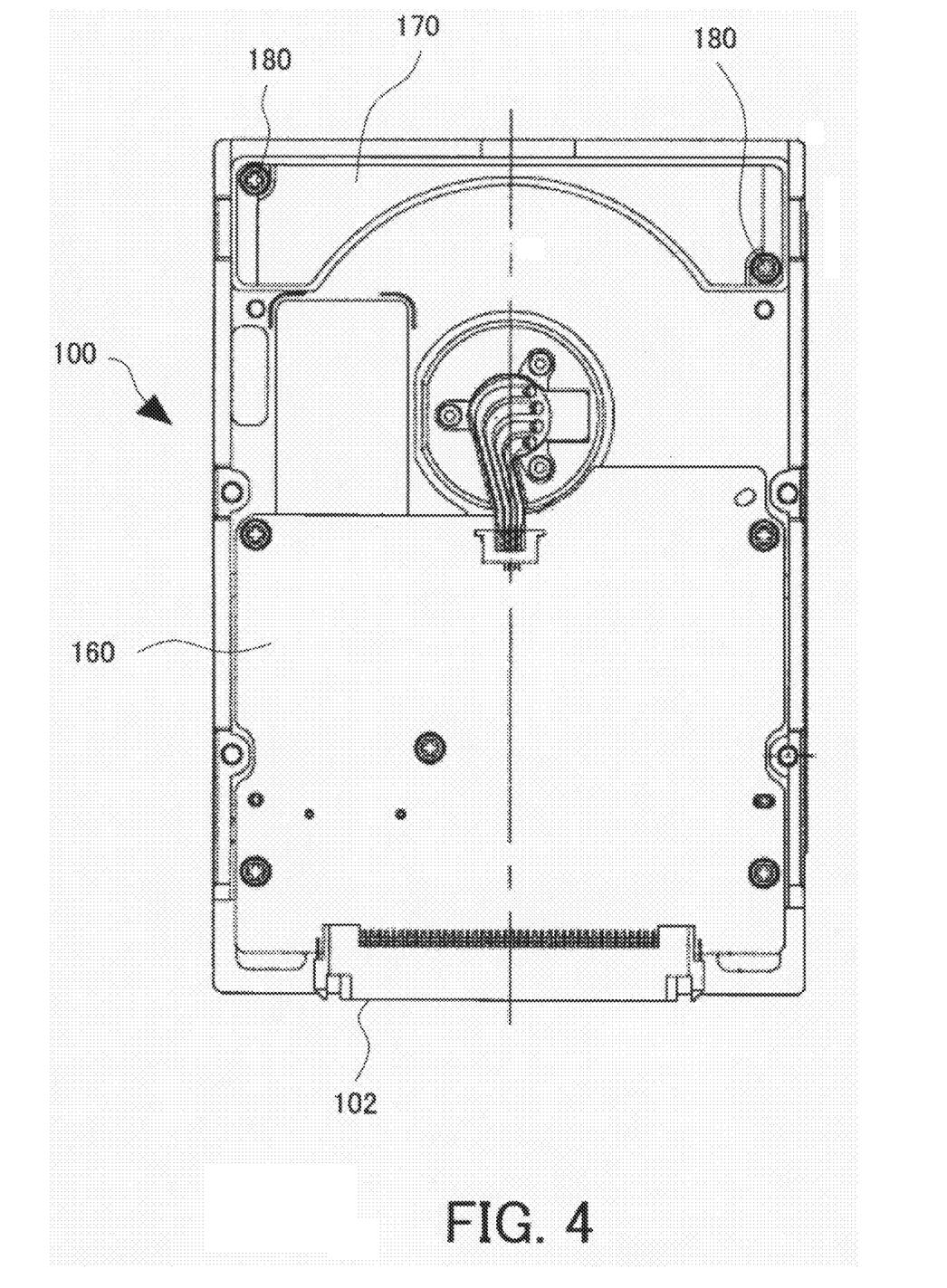
FIG. 4 is a schematic rear view of a HDD according to one embodiment of the present invention.
Figure 5:
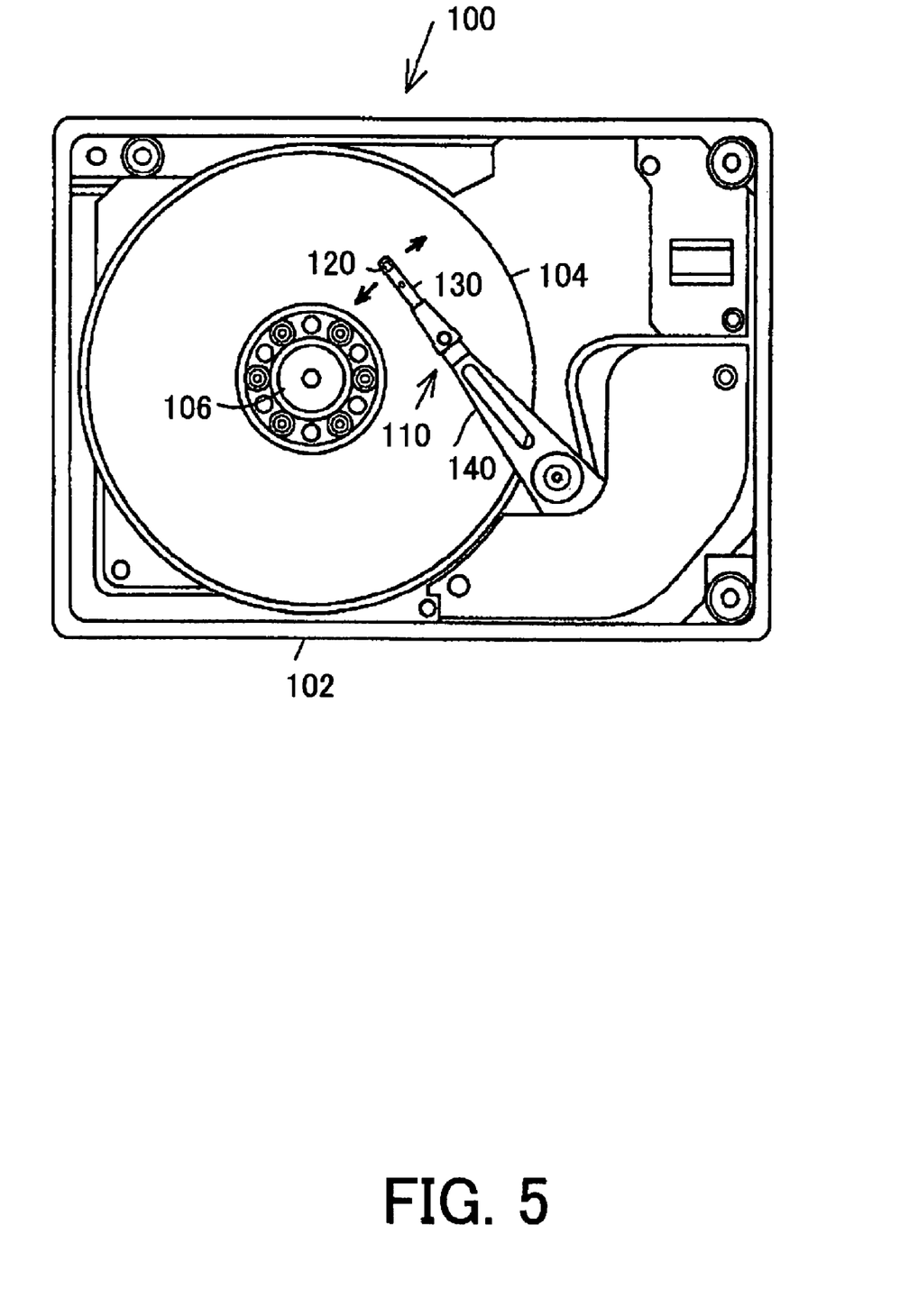
FIG. 5 is a plane view showing an internal structure of the HDD according to one embodiment of the present invention.

Referring now to FIGS. 4 and 5, a description will be given of an attachment of the weight 170. Here, FIG. 4 is a rear view of the HDD 100, and FIG. 5 is a schematic plane view of the internal structure of the HDD 100. The weight 170 is fixed onto a back surface of the housing 102 by screws 180, as shown in FIG. 4. Thereafter, the housing 102 is put in a clean room, and mounted with components shown in FIG. 5 (assembly of the HDD 100).

The weight 170 needs to be mounted outside a printed circuit board 160 area. A position of the printed circuit board 160 is predetermined from the physical interface with an apparatus that installs the HDD 100, the physical interface with the read/write FPC, and a noise reduction. A position of the weight 170 is limited to part that does not interfere with the printed circuit board 160 and components in the HDD within a shape of the housing 102 shown in FIG. 4. Thus, a shape of the weight 170 should be precisely formed from the necessity to mount the weight 170 in the limited area and the necessity to secure the predetermined weight.

In the assembly process in the clean room, various components shown in FIG. 5 are mounted. HDD 100 includes, as shown in FIG. 5, plural magnetic discs 104 each serving as a recording medium, a spindle motor 106, and a head stack assembly ("HSA") 110 in the housing 102.

The housing 102 is made, for example, of aluminum die cast base, and has a rectangular parallelepiped shape, to which a cover (not shown) that seals the internal space is joined. The magnetic disc 104 has a high surface recording density, such as 100 Gb/in$^2$ or greater. The magnetic disc 104 is mounted on a spindle of the spindle motor 106 through its center hole.

The spindle motor 106 rotates the magnetic discs 104 at such a high speed as 15,000 rpm, and includes, for example, a brushless DC motor (not shown) and a spindle as its rotor part. The HSA 110 includes a magnetic head part 120, a suspension 130, a carriage 140.

The magnetic head part 120 includes a slider, and a head device built-in film that is jointed with an air outflow end of the slider and has a read/write head. The slider has an approximately rectangular parallelepiped shape, and is made of $Al_2O_3$—TiC (Altic). The head is a MR inductive composite head that includes an inductive head device that writes binary information in the magnetic disc 104 utilizing the magnetic field generated by a conductive coil pattern (not shown), and an MR head that reads the binary information based on the resistance that varies in accordance with the magnetic field applied by the magnetic disc 104.

The suspension 130 serves to support the magnetic head part 120 and to apply an elastic force to the magnetic head part 120 against the magnetic disc 104, and is, for example, a stainless steel suspension. The suspension 130 also supports a wiring part (not shown) that is connected to the magnetic head part 120 via a lead etc., through which the sense current, write information and read information are supplied and output between the head and the wiring part.

The carriage 140 is also referred to as an actuator, an E-block due to its E-shaped section or actuator ("AC") block. The carriage 140 serves to rotate or swing the magnetic head part 120 in the arrow direction shown in FIG. 5.

The printed circuit board 160 is fixed onto the back surface of the housing 102 by the screws 180 as shown in FIG. 4. The control system is implemented as a control board in the HDD 100, and includes a controller, an interface, a hard disc controller (referred to as "HDC" hereinafter), a write modulator, a read demodulator, a sense-current controller, and a head IC.

The weight 170 reduces vibrations and noises of the housing 102. The noises and vibrations occur (1) when the rotation of the motor 106 that drives the discs 104 transmits to the housing 102 and the entire HDD 100 resonates, and (2) when the reaction of the seek operation by the carriage 140 that drives the magnetic head part 120 minutely vibrates the housing 102 and the entire HDD 100 resonates. The resonance of the entire HDD becomes residue vibrations, and lowers the head positioning performance. The increased weight of the housing 102 is effective to damp the vibrational energy of the housing 102 and shift the resonance frequency.

In operation of the HDD 100, the controller drives the spindle motor 106 and rotates the discs 104. The airflow associated with the rotations of each disc 104 is introduced between the disc 104 and slider, forming a ultrathin air layer and thus generating the floating force that enables the slider to float over the disc surface. The suspension 130 applies an elastic compression force to the slider in a direction opposing to the floating force of the slider. As a result, the floating force and the elastic force are balanced and the gap between the head 120 and the disc 104 is maintained. As discussed above, the weight 170 reduces the vibrations and noises of the housing 102 for precise positioning of the head 120.

In writing, the controller receives data from the host computer, such as a PC (not shown) through the interface, selects the inductive head, and sends an instruction to the write modulator through the HDC. In response, the write modulator sends data to the head IC after modulating the data. The head IC supplies the write current to the inductive head after amplifying the modulated data. Thereby, the inductive head writes the data in a target truck.

In reading, the controller selects the MR head, supplies the predetermined sense current to the sense current controller via the HDC. In response, the sense current controller supplies the sense current to the MR head via the head IC. Thereby, the MR head reads desired information from the target track on the disc 104.

Further, the present invention is not limited to these preferred embodiments, and variations and modifications may be made without departing from the scope of the present invention. For example, this embodiment discusses the HDD, but the present invention is applicable to another type of magnetic disc drive, such as a magneto-optic disc drive.

What is claimed is:

1. A storage that records information in and reproduces the information from a disc-shaped recording medium by rotating the recording medium, said storage comprising:
    a driver that drives the recording medium;
    a head part that writes information in and reads the information from the recording medium;
    a housing that accommodates the recording medium, the driver, and the head part; and
    a damper accommodated in the housing, and formed by a mold that has a concave part corresponding to a shape of the damper, and includes plural first gates that introduce molten metal to the concave part, an overflow well formed at a first position opposite to one of the first gates with respect to the concave part, or at a second position on a side of the shape that intersects an extending direction of the first gates, and a second gate that introduces the molten metal to the overflow well.

2. A storage according to claim 1, wherein the damper is made of zinc alloy.

\* \* \* \* \*